United States Patent [19]

Fiol

[11] Patent Number: 4,555,029
[45] Date of Patent: Nov. 26, 1985

[54] APPARATUS FOR THE DISPLAY OR THE STORAGE OF BICYCLES OR LIKE VEHICLES

[76] Inventor: James Fiol, rue Jules Ferrier, 42140 Chazelles sur Lyon, France

[21] Appl. No.: 480,316

[22] Filed: Mar. 30, 1983

[30] Foreign Application Priority Data

Jul. 26, 1982 [FR] France .................. 82 13294

[51] Int. Cl.$^4$ .................. A47F 2/00
[52] U.S. Cl. .................. 211/22; 211/195; 211/189
[58] Field of Search .................. 211/5, 17, 18, 19, 20, 211/21, 22, 189, 195, 202, 201; 248/166, 165

[56] References Cited

U.S. PATENT DOCUMENTS

| 564,787 | 7/1896 | Hart . | |
|---|---|---|---|
| 592,544 | 10/1897 | Graham . | |
| 1,883,974 | 10/1932 | Kusterle | 211/195 X |
| 2,803,349 | 8/1957 | Talbot . | |
| 4,108,316 | 8/1978 | Slater | 211/189 X |

FOREIGN PATENT DOCUMENTS

| 1170808 | 5/1964 | Fed. Rep. of Germany . | |
|---|---|---|---|
| 2377317 | 11/1978 | France . | |
| 22677 | of 1894 | United Kingdom | 211/22 |
| 296892 | 10/1928 | United Kingdom . | |

Primary Examiner—J. Franklin Foss
Assistant Examiner—Sarah A. Lechok
Attorney, Agent, or Firm—Eric P. Schellin

[57] ABSTRACT

An apparatus for storing and displaying bicycles or like vehicles which can be folded and angularly adjusted for display and storage purposes. The bicycles are supported on tubular elements that freely cooperate with a ground abutting framework. Each tubular element has receiving means which support a bicycle vertically and is provided with contoured portions at both ends to support and position the wheels of the bicycle and a vertical arm in between the contoured portions that supports the lower portion of the bicycle frame. For display purposes the tubular elements freely cooperate with pairs of posts of different sizes that cooperate freely with the supporting framework. The supporting framework has two independent tubular elements to which the posts are attached and to which a tubular element can be attached directly. The posts and tubular elements are attached to ferrules projecting from the independent elements. The framework can be angularly positioned into various configurations for display of bicycles or completely folded away for storing or transport.

12 Claims, 10 Drawing Figures

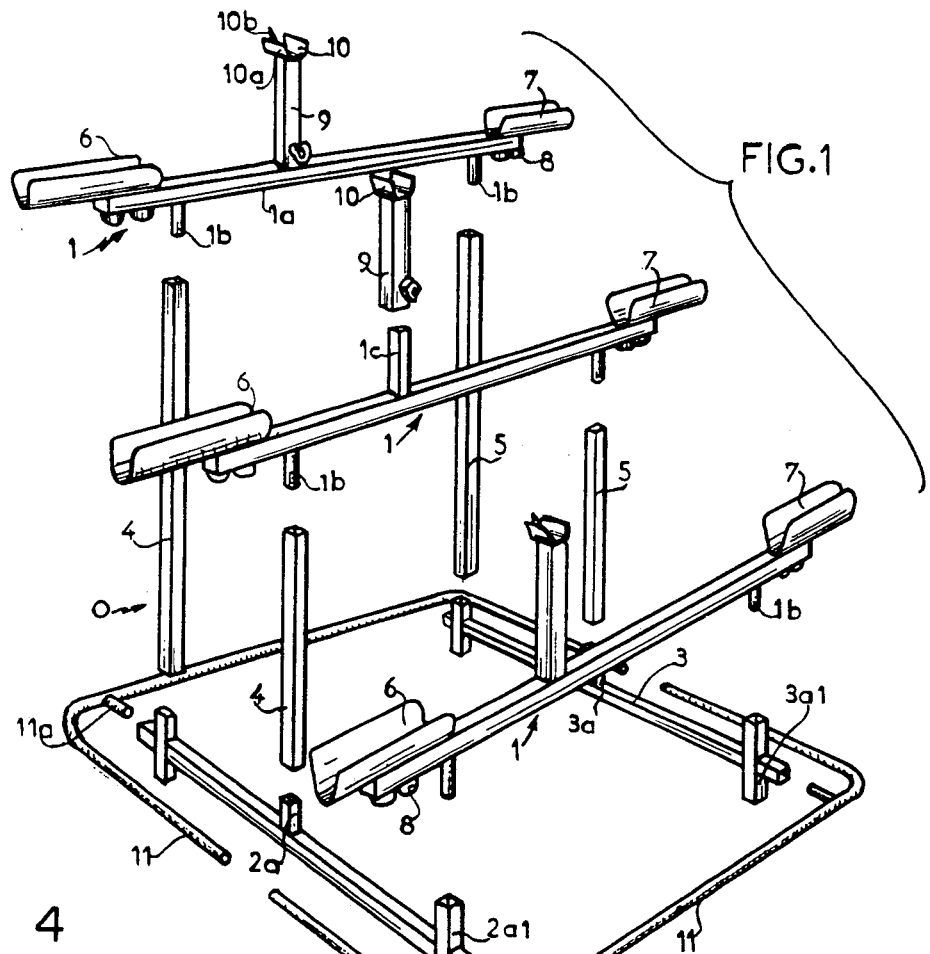
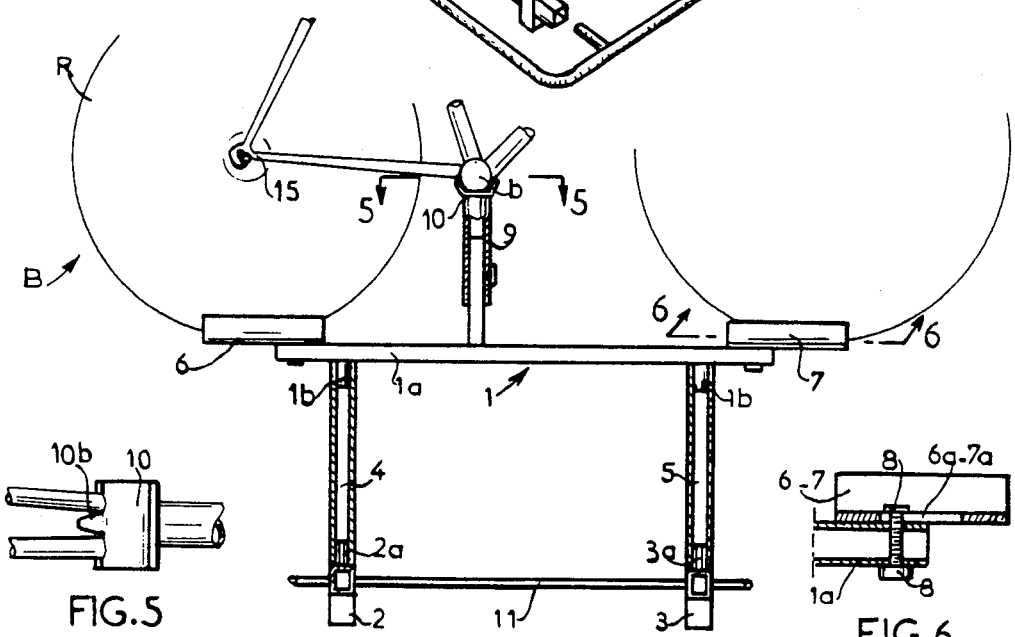
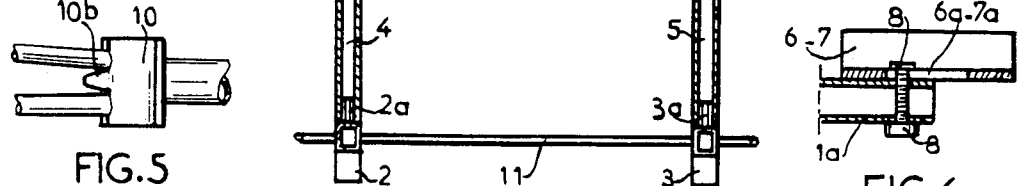
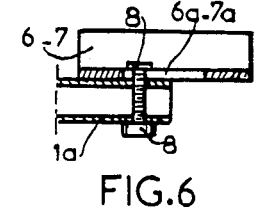

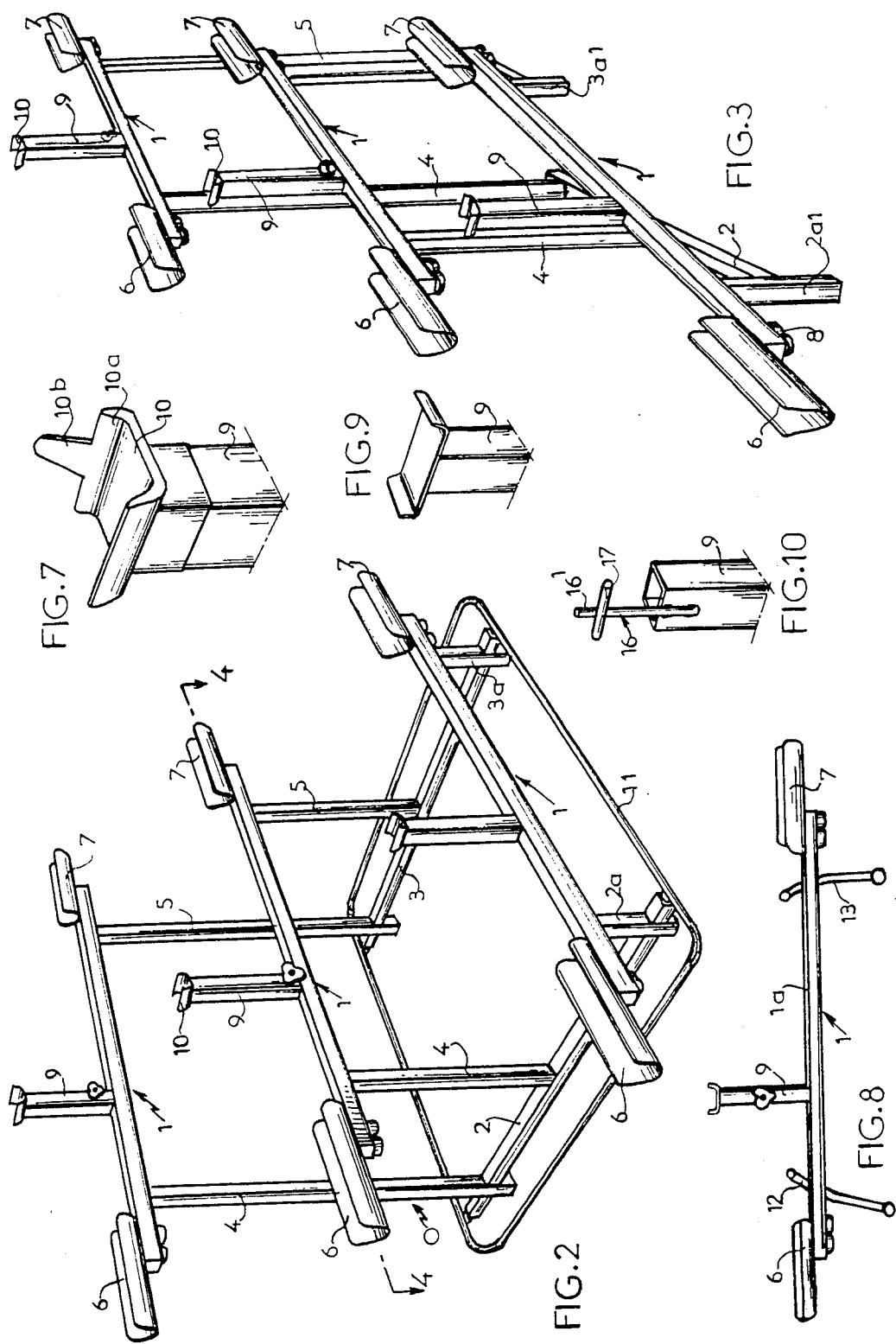

4,555,029

APPARATUS FOR THE DISPLAY OR THE STORAGE OF BICYCLES OR LIKE VEHICLES

BACKGROUND OF THE INVENTION

The invention is directed to an apparatus for the displaying or the storing bicycles or like vehicles.

The invention pertains to accessories used for cycles.

Display supporting devices capable of being adapted for bicycles in order to display them in a warehouse, or to store them in a garage or workshop, are known. Generally, these supports have a ground supporting base which is surmounted by a vertical element for holding the bicycle by means of the crank of the bicycle which is engaged within a groove on the vertical element. It is apparent that the engagement of the crank on the vertical support element is not always easy, as it is necessary to lift the bicycle and to hold the crank in a vertical position. Likewise, excessive stresses and strains occur at the level of the crank-case, as the bicycle is maintained by only one overhanging crank, which bears the whole weight of said bicycle.

Finally, such a type of support is made to receive one bicycle only.

Other display devices are capable of receiving a plurality of bicycles, wherein they have a rigid supporting framework which restrains their possibilities of use.

SUMMARY OF THE INVENTION

In order to eliminate these disadvantages, an apparatus for displaying and/or storing bicycles in accordance with the invention is remarkable by its simplified and functional design enabling this apparatus to accommodate a plurality of bicycles for display or storage of same according to various positions, the apparatus being moreover particularly well adapted for storage and transport.

For this purpose, the apparatus in accordance with the invention includes essentially at least one supporting element which is made and arranged for holding the bicycle vertically. The supporting element or elements are capable of co-operating freely at each end with a framework resting on the ground, while also being removable. The framework is made of detachable elements and designed in combination with the bicycle support or supports to be folded back and/or positioned angularly in various configurations.

These and other characteristics will be readily apparent from the following description.

BRIEF DESCRIPTION OF THE DRAWINGS

In order to make the object of the invention more concrete, without however restricting it the invention is illustrated in the attached drawings:

FIG. 1 is a perspective view of the apparatus in accordance with the invention, the various constituent elements are shown in an exploded manner, and in mounting alignment;

FIG. 2 is a perspective view corresponding to FIG. 1, but after the assembly of the various elements;

FIG. 3 is a perspective view showing an example for folding the apparatus;

FIG. 4 is a sectional view along the line 4—4 of FIG. 2, in which the positioning of a bicycle is shown;

FIG. 5 is a partial sectional view along the line 5—5 of FIG. 4;

FIG. 6 is a partial sectional view along the line 6—6 of FIG. 4;

FIG. 7 is a perspective view of a portion of the bicycle supporting element;

FIG. 8 is an alternative form of embodiment of the apparatus;

FIG. 9 is an alternative view of the supporting element to be adapted underneath the base of the frame;

FIG. 10 is a view of a further embodiment of the supporting element to be adapted underneath the base of the frame.

DETAILED DESCRIPTION OF THE PREFERRED EMBODIMENTS

In order to make the object of the invention better understood, the invention will be now described in a non-restrictive manner with reference to the examples of embodiment shown in the Figures of the drawings.

It will be seen from FIG. 1 that the apparatus is essentially comprised of at least one supporting element (1) arranged for holding a bicycle (B) positioned vertically, and of a framework resting on the ground, and denoted generally by (O).

In accordance with a first characteristic of the invention, the framework (O) is made from a plurality of independent elements arranged for nesting relative to one another, for constituting a framework which is quite easy to be taken down and folded back while being capable of occupying various angular positions. Each one of the constituent elements is made from tubes.

For this purpose, the framework (O) includes at least two elements (2 and 3) which are hollow having square cross section, which rest on the ground. Each element (2 and 3) has in a protruding and perpendicular manner at least one, but generally several vertical ferrules (2a and 3a) for the nesting and the centering of vertical elements (4 and 5) of a complementary cross section. In a preferred, however not substantially limitative manner, the elements (2 and 3) are provided with end ferrules (2al) and (3al) and with one or more intermediate ferrules (2a-3a). It will be pointed out that the end ferrules (2al-3al) serve also as a footing by protruding beyond the underside of the elements (2 and 3). Each ferrule is hollow having a square cross section.

In accordance with a further characteristic, the ends of the bicycle supporting elements (1) are arranged for being nested and positioned either within the vertical elements (4 and 5) or directly within the ferrules (2a-3a) of two parallel and opposite elements (2 and 3). It will be readily understood that the supports (1) serve as frame stays for the entire framework.

For this purpose, each support (1) is provided with centering studs or fingers (1b) of rounded section, protruding beyond the underside of a tubular element (1a) having a square cross section, which are to be engaged freely within the hollow section of the elements (4–5) or within the ferrules (2a-ea), with angular swivelling capacity.

The tubular element (1a) is provided at each one of the ends thereof with supporting contoured portions (6 and 7) which are designed to permit, in a known manner, the positioning and the centering of the wheels (R) of the bicycle (B). Each contoured portion (6 and 7) is secured at the end of the element (1a) in an endwise adjustable manner in order to vary the spacing between two opposite contoured portions so as to meet the dimensional differences of the bicycles. For instance, the contoured portions (6 and 7) are secured by means of screws (8) which are engaged freely within a port (6a–7a) of within various holes drilled in the bottom of said contoured portions (6 and 7) (FIG. 6).

The top side of the element (1a) is provided with a receiving means comprising the supporting contoured portions (6 and 7) and between said contoured portions, a vertical ferrule (1c) secured by welding or otherwise projecting beyond the element (1a). This ferrule (1c), of square cross section, receives for free sliding a vertically adjustable hollow rod (9) to accomodate the various dimensions of the bicycles, and permit the positioning and support of the bicycle, in combination with the supporting contoured portions (6 and 7).

For this purpose, and in accordance with a first alternative form of embodiment, the upper end of rod (9) is provided transversely with a supporting cradle (10) which is arranged perpendicular to the axis of the tubular element (1a) the section of which permits the support and the centering in position of the crank-case (b) (FIG. 4). For instance, this cradle (10) has a U-shaped cross section, the flanges (10a) of which are of reduced height and very slightly spaced (FIG. 1). Moreover, one of these flanges, approximately in the medial portion thereof, is provided directly or in an inserted manner with an indexing finger (10b) for engagement between the bracings of the bicycle frame (FIG. 5) to ensure thereby the angular positioning of said bicycle (B).

Therefore, the bicycle is maintained vertically positioned on the support (1) at three points: the two supporting contoured portions (6 and 7) in which the wheels (R) are centered, and the cradle (10) of the vertical arm (9) for supporting and centering the crank-case in combination with the bracings.

In accordance with a further alternative form of embodiment illustrated in FIG. 9, the upper end of rod (9) is also provided with a supporting cradle (14) the section of which permits the support and the centering in position of the base of the bicycle frame. The base is approximately horizontal and provides the connection between the crank-case and the rear lug (15) of the frame on which the axle of the rear wheel is mounted. This cradle has its open section parallel to the axis of the supporting bar (1).

In accordance with the alternative form of embodiment of FIG. 10, the rod (9) is provided directly or by means of an insert with a vertical extension (16) in the form of a pin, and with a horizontal bar (17) disposed cross wise relative to said pin, this assembly forming a supporting cradle for the base of the bicycle frames. Said base is abutted upon the ends of the horizontal bar on either side of the free upper end (16') of the vertical extension, ensuring thereby a limitation for the transverse positioning of the bicycle.

The assembly of the display apparatus in accordance with the invention is particularly easy, as well as the positioning of the bicycle or bicycles. As a matter of fact, it will be sufficient to brace by mere nesting the ground abutting elements (2 and 3) by means of the supporting elements (1) to be engaged into the ferrules (2a–23a) and/or into the vertical elements (4 and 5) previously nested within said ferrule. It must be pointed out that the vertical elements (4 and 5) have a different height two by two in order to achieve a staged display of the bicycles (FIGS. 1 and 2).

Concerning the proper positioning of the bicycles, it will be sufficient to lift them up and to abut them merely on the contoured portions (7 and 8) by the wheels (R) and on the cradle (10) which is lowered or lifted slidably for a faultless accommodation underneath the crank-case (b) (FIG. 4).

In a manner which is particularly advantageous, it will be noted that the framework can be distorted angularly, so that the ground abutting elements (2 and 3) surmounted or not by the vertical elements (4 and 5) are capable of occupying various angular positions relative to the supporting elements (1). This offers a double advantage, for it is possible to offset angularly the display of the bicycles in view of a better display. In addition, such an offset display results in a reduced spatial display when the pedals are taken down and the handlebar are turned away. Furthermore, when the apparatus is folded back completely the apparatus can be stored and/or transported (FIG. 3) after the bicycle or bicycles are removed.

This linking of the ground abutting elements (2) is effected by means of the centering studs (1b) which are freely engaged within the hollow sections of the posts (4 and 5) and/or of the ferrules (2a–3a) of the ground abutting elements (2–3).

In accordance with a further characteristic of the invention, the supporting elements (1) are adjustable linearly for the display of the bicycles of various lengths such as tandems.

For instance, the tubular element (1a) of the support (1) may be made of several telescopic parts capable of being extended lengthwise. Likewise, the tubular element (1a) made of one or several parts may be provided with a plurality of crank-case abutting and centering vertical arms in view of tandem display for instance.

As more particularly shown in FIGS. 1 and 2, the ground abutting elements (2 and 3) may be detachably provided at the end thereof, or lengthwise at convenient locations, with one or more tubular contoured portions (11) designed for ensuring a peripheral protection at the bottom of the apparatus. Each contoured portion (11) is provided with ferrules (11a) capable of being engaged and centered within the hollow section of the ground abutting elements (2 and 3).

In an alternative form of embodiment, the supporting element as described previously may cooperate in a fixed or detachable manner with two ground abutting contoured portions (12 and 13) designed for receiving one bicycle support (1) only (FIG. 8).

It will be obvious that the apparatus in accordance with the invention may be made in any size and of any material, and that the ground abutting elements (2–3) may be arranged and dimensioned to receive any number of bicycle-holders (1) with or without the raising posts (4–5).

The advantages will be apparent from the description, and the following features will be more particularly pointed out:

The detachable character of the entire unit.

The arrangement of the framework in order to be adapted to the existing space while permitting a various display of the bicycles, and a reduced bulk for the storage and/or the transport of the apparatus without bicycles thereon.

The suppression of the necessity of any intermediary assembly part for mounting the apparatus.

The good positioning of the bicycle or bicycles, without any stress.

The easiness of display.

The possibility of displaying a plurality of bicycles.

Finally, it must be pointed out that with the framework as set forth, it is possible to mount an advertising panel which would for instance co-operate rearwardly of the ground abutting elements (2-3).

The invention is not limited in any way to the use nor to the form of embodiment of the various parts thereof which have been more particularly described; on the contrary, any alternative form of embodiment remains within the scope of the invention.

I claim:

1. A readily portable and adjustable apparatus for the display and storage of bicycles or similar vehicles, comprising:

a plurality of support elements having a plurality of tubular elements that are provided with a plurality of receiving means for holding a plurality of bicycles vertically; and a ground abutting framework having two independent elements abutting the ground on which said support elements are removably received, said framework further comprising at least one pair of posts which are received on and cooperate freely with said independent elements and freely rotates with said tubular elements of said supporting elements, wherein said supporting elements cooperate freely with said framework so that said supporting elements can be readily positioned angularly in various configurations for displaying bicycles and folded together for storing and transport of said apparatus.

2. An apparatus as defined by claim 1 wherein said two independent elements of said framework are provided with a plurality of vertical ferrules which project beyond said independent elements.

3. An apparatus as defined by claim 2 wherein said independent elements, said vertical ferrules and said pair of posts are tubular with a square cross section.

4. An apparatus as defined by claim 2 wherein said tubular elements of said supporting elements are provided with centering studs having a rounded cross section which cooperate freely with said framework when received by said framework.

5. An apparatus as defined by claim 4 wherein said centering studs of at least one said tubular elements is received in said vertical ferrules of said independent elements, and said centering studs of another said tubular element are received in at least one pair of said posts of said framework, said at least one pair of posts also engages other of said vertical ferrules of said independent elements.

6. An apparatus as defined by claim 5 wherein each of said tubular elements of said supporting elements has two ends, the receiving means of said supporting element comprises horizontally adjustable contoured portions for positioning and centering the wheels of a bicycle on said tubular element, said receiving means further comprises at least one vertically adjustable arm mounted on said tubular element, said arm is provided with a free end which is arranged to support and center the lower portion of a bicycle frame on said tubular extension.

7. An apparatus as defined by claim 6 wherein said free end of said vertical arm is provided with a supporting cradle having flanges arranged perpendicular to the axis of said tubular element, said supporting cradle supports and centers the crankcase of a bicycle frame, one of the flanges is provided with an indexing finger for engagement between bracings of a bicycle frame.

8. An apparatus as defined by claim 6 wherein said free end of said vertical arm is provided with a supporting cradle having flanges that are arranged parallel to the axis of said tubular element, said supporting cradle supports and centers the base portion of the bicycle frame.

9. An apparatus as defined by claim 6 wherein said free end of said vertical arm is provided with a pin shaped vertical extension having a horizontal cross bar, the base portion of the bicycle frame is supported on said horizontal bar on either side of said vertical extension.

10. An apparatus as defined by claim 5 wherein said at least one pair of posts comprises a plurality of pairs of posts said pair of posts are of different height for the staged display of bicycles on said apparatus.

11. An apparatus as defined by claim 6 wherein each of said tubular elements comprises a plurality of telescoping parts for providing linear adjustment of said tubular element.

12. An apparatus as defined by either claim 1, 2, 3, 4, 5, 6, 7, 8, 9 or 10 further comprising at least one contoured tubular portion which is detachably received in said two independent elements which fix the angular orientation of the supporting elements and also providing for peripheral protection of said apparatus.

* * * * *